(12) United States Patent
Pickren

(10) Patent No.: US 6,408,663 B1
(45) Date of Patent: Jun. 25, 2002

(54) METHOD AND APPARATUS FOR TRUING CRANKSHAFTS

(75) Inventor: Gregory Bernard Pickren, Clearwater, FL (US)

(73) Assignee: Short Block Technologies, Inc., Clearwater, FL (US)

( * ) Notice: Subject to any disclaimer, the term of this patent is extended or adjusted under 35 U.S.C. 154(b) by 0 days.

(21) Appl. No.: 09/790,701

(22) Filed: Feb. 23, 2001

(51) Int. Cl.$^7$ .............................................. B21C 51/00
(52) U.S. Cl. .................. 72/31.03; 72/31.02; 29/888.08
(58) Field of Search ................................ 72/17.3, 19.6, 72/31.02, 31.03; 29/6.01, 888.08

(56) References Cited

U.S. PATENT DOCUMENTS

| | | | | |
|---|---|---|---|---|
| 1,308,501 A | * | 7/1919 | Littell | ........................ 72/31.03 |
| 1,605,310 A | * | 11/1926 | Weaver | ...................... 72/31.03 |
| 3,948,076 A | * | 4/1976 | Eitel et al. | ...................... 72/384 |
| 4,203,308 A | * | 5/1980 | Davis | ........................ 72/31.03 |
| 4,517,717 A | | 5/1985 | Gentry | |
| 4,682,489 A | * | 7/1987 | Bauerle et al. | ................ 72/460 |
| 4,860,566 A | | 8/1989 | Augustin | |
| 4,979,335 A | | 12/1990 | Weber et al. | |
| 5,001,917 A | | 3/1991 | Berstein | |
| 5,235,838 A | | 8/1993 | Berstein | |
| 5,333,480 A | | 8/1994 | Berstein | |
| 5,625,945 A | | 5/1997 | Paro | |
| 5,761,821 A | * | 6/1998 | Laycock | ..................... 33/555.1 |
| 5,984,599 A | | 11/1999 | Janssen | |

* cited by examiner

Primary Examiner—Ed Tolan
(74) Attorney, Agent, or Firm—Raúl V. Fonte

(57) ABSTRACT

The invention discloses a method and an apparatus for truing "pressed-together crankshafts" of the type found in multiple-cylinder-engines such as those used in personal watercrafts and snowmobiles. The truing of these crankshafts is effected by a truing tool comprised of a set of lockable V-block-type holding means, a hinging movable shelf so equipped as to cause one of the lockable V-block-type holding means to move the crankshaft alternatively into a measuring position and a truing position, a cam-operated lever, sliding position detection means and a top-mounted clamp, all of which are attached, directly or indirectly, to a rigid supporting base. The set of lockable V-block-type holding means is designed in accordance with the dimensions of the bearings and the journals of the crankshaft. The crankshaft is trued by placing it on the lockable V-block-type holding means and setting the truing tool on the measuring position, then detecting the location and degree of out-of-tolerance distortion with respect to the rotating axis of the crankshaft as it rotates, setting the truing tool on the truing position, and finally applying the required forces to the distorted portions until the crankshaft is straight. The measuring-and-truing cycle can be repeated as many times as necessary or desirable, all without removing the crankshaft from the truing apparatus.

20 Claims, 7 Drawing Sheets

METHOD AND APPARATUS FOR TRUING CRANKSHAFTS

FIELD OF THE INVENTION

The present invention relates to a method and apparatus for truing crankshafts and, more particularly, to a method and apparatus for the fast and cost effective truing of crankshafts during the manufacture or reassembling of pressed-together multi-cylinder engine crankshafts. Specifically, the invention relates to a novel technique and tool for truing the crankshafts used in personal watercraft and snowmobile engines, as well as certain outboard engines and other multi-cylinder two-stroke engines.

BACKGROUND OF THE INVENTION

Crankshafts for precision machines must be accurately manufactured, or reassembled, to properly drive the engine components of the machines of which they are part. Methods and tools used in the manufacture of crankshafts are described in U. S. Pat. Nos. 4,979,335, 5,625,945 and 5,984,599. A most important aspect of such accurate manufacturing, or reassembling, is the truing of the crankshafts. A crankshaft is often comprised of multiple crankshaft sections, and each of these sections usually consists of two "journals", connected by a center pin, and one or more associated bearings. A "journal" is an annular disc, or "web", with a peripheral pin transversely attached to it. A "connecting rod", attached to the peripheral pin, connects the crankshaft to the corresponding piston of the engine of which the crankshaft is part. When a crankshaft is comprised of multiple crankshaft sections, "truing" refers to the straightening of the crankshaft, whose sections are out of alignment with respect to the crankshaft's axis of rotation, by pinching, hammering, wedging or otherwise applying a force or forces on the components of the sections so as to realign the components until the distortion of the crankshaft is minimized or eliminated. Uncorrected distortions will tend to cause misalignment of the main bearings, crankpins and other components of the crankshaft sections and result in a distorted crankshaft, that is, one that wobbles. These deviations from the true running of the crankshaft sections, with respect to the axis of rotation of the crankshaft, are remedied by the truing, or straightening, operation. Proper truing of the crankshafts is particularly critical when the crankshafts are "pressed-together crankshafts", that is, crankshafts used in multi-cylinder engines where the connecting center pins of at least some of the sections are press fit to one or both of the journals to which they are connected. Press fitting is the assembling of any two machined pieces by creating a bond between them as a result of the fact that one of them has been inserted within the other, so as to be properly in place, by the use of force. For example, a round connecting center pin may be press fit to a journal by providing, in the journal, an orifice with a diameter between 0.0002 and 0.004 inches smaller than the diameter of the pin, and forcing the pin into the orifice by mechanical exertion. Pressed-together crankshafts for multi-cylinder engines are built and reassembled by manufacturers and rebuilders such as Kawasaki, Polaris, Yamaha and others for combustion engines with several cylinders and, in particular, for combustion engines for personal motorized watercrafts, snowmobiles and similar vehicles. In contrast to pressed-together crankshafts, "single-piece crankshafts" are designed so that the journals and connecting center pins form one solid single piece, and, since the crankshafts themselves are forged in one piece, the connecting rods and the bearings are designed so that they may be replaced and/or serviced while the crankshaft remains in one piece. As a result, single-piece crankshafts cannot be disassembled and reassembled, and, consequently, the crankshaft truing techniques for single-piece crankshafts are different from the crankshaft truing techniques for pressed-together crankshafts, and normally involve bending and compressing the one-piece crankshaft until it runs true on one axis of rotation. Pressed-together crankshafts, on the other hand, must be disassembled and reassembled whenever their bearings fail, or when their connecting rods wear or break due to extended use. Otherwise, the engines do not operate properly, or simply stop running, unless the crankshafts are taken apart and reassembled, aligned and trued. Also, pressed-together crankshafts often have to be taken apart to replace defective bearings and to perform repairs or maintenance. When taken apart, these crankshafts always fall out of tolerance and have to be re-aligned and re-trued.

Techniques for truing, or straightening, workpieces such as crankshafts are described in U.S. Pat. Nos. 4,517,717, 4,860,566, 5,001,917, 5,235,838 and 5,333,480. Most of these techniques are concerned with single-piece crankshafts, and they involve bending, flexing, hard rolling and the like, by themselves or in combination; but such techniques do not allow an operator to determine the degree of distortion and perform the necessary straightening correction on a pressed-together multi-cylinder-engine crankshaft without having to remove the crankshaft from the work station. Removing a pressed-together multi-cylinder-engine crankshaft from the work station is time consuming, adds an extra step, in which the probability of human and/or machine error increases, and contributes additional and unnecessary cost to the truing operation. Conventional crankshaft truing techniques can be cumbersome and time-consuming, and add substantial costs to the building and reassembling of crankshafts, particularly when the crankshafts are pressed-together crankshafts. It is apparent, then, that a need exists to provide a technique and a tool for properly and quickly truing crankshafts, and, in particular, for properly and quickly truing pressed-together multi-cylinder-engine crankshafts in minimum time and with minimum expense.

SUMMARY OF THE INVENTION

An object of this invention is to provide a technique and a tool for accurately truing crankshafts. An object of the instant invention is also to provide a method and an apparatus for accurately and rapidly truing pressed-together crankshafts, which method and apparatus may be used on practically all kinds of pressed-together crankshafts regardless of their make or origin. Another object of the invention is to provide an inexpensive method and apparatus for properly truing the pressed-together crankshafts normally found in the multiple-cylinder combustion engines used in personal watercrafts and snowmobiles, as well as in other multiple-cylinder outboard engines.

A further object of this invention is to provide a method and a tool for the accurate, rapid and inexpensive truing of said crankshafts that can be used and operated by essentially one operator with minimum amount of training and which allows the operator to detect and measure the degree of distortion and perform the required correction while the crankshafts remain on the work station, that is, without having to remove the crankshafts from the work station. These and other objects of the invention will become apparent from the disclosure that follows.

The above objects are achieved by the truing tool and method of the instant invention. When used properly and in accordance with the method disclosed herein, the truing tool, or apparatus, of this invention allows one single operator to accurately determine the existence, location and degree of distortion and then proceed to straighten and assemble pressed-together crankshafts in minimum time and with minimum expense.

The truing tool, or apparatus, of this invention comprises a supporting base, a set of lockable holding means, a movable shelf, a cam-operated lever, sliding position detection means, and a top-mounted clamp. When assembled in the manner provided herein, the apparatus provides the means for holding the crankshaft to be trued in a "measuring position", that is, in a position with respect to the work or assembly station where an operator may detect, locate and measure the degree of distortion and decide if, where and how much force to apply to the crankshaft in order to straighten it. The truing tool of this invention also provides the means for holding the crankshaft in a "truing position", that is, in a position with respect to the work or assembly station where an operator may then proceed to apply the forces necessary to effect the straightening of the crankshaft, all without removing the crankshaft from the work or assembly station and while allowing the operator to switch back and forth from the measuring position to the truing position as often as necessary or desirable.

The supporting base comprises a rigid plate, preferably made of steel, provided with multiple openings strategically located to receive parts of the other components of the truing tool and to secure the base to a worktable or bench. The front edge of the supporting base is provided with orifices for mounting the cam-operated lever at a convenient location along the edge. The base is preferably equipped with at least two rigid members, parallel to each other and transversally located with respect to the surface of the supporting base and provided with means for accepting and coupling with the hinging means of the movable shelf, as more particularly set forth below.

The set of lockable holding means comprises one movable support block and two companion stationary support blocks, each such block provided with one or more openings adapted to receive one or more bolts or other means for securing the blocks, and shaped as to allow the blocks to receive and hold the crankshaft to be trued. The movable support block is provided with one or more openings at the bottom to allow it to be locked to the movable shelf and hinge up and down with respect to the surface of the supporting base when the movable shelf is driven by the cam-operated lever, as more particularly set forth below. The movable support block is flanked by the two companion support blocks, which are stationary. For convenience, the movable support block is sometimes referred to in this description as the "inner support block", and the two companion stationary support blocks are sometimes referred to as the "outer support blocks". The three support blocks are preferably made of steel, and are preferably V shaped, but they may be made of any other rigid metal or material and shaped in any other configuration or form that will allow the blocks to receive and hold the crankshaft to be trued. The inner support block is located and sized to receive and hold the bearings of the crankshaft when the truing tool is in the measuring position. The two outer support blocks are located and sized to receive and hold the crankshaft journals when the truing tool is in the truing position.

The movable shelf comprises an L-shape rigid member provided with a through rod or other means for hinging up and down with respect to the surface of the supporting base when driven by the cam-operated lever. The movable shelf is also provided with at least one orifice capable of accepting a screw, or similar means, for locking the shelf to the inner support block. Preferably, the bottom of the movable shelf is provided with a recessed groove sized to receive and hold in place the push rod of the cam-operated lever.

The cam-operated lever comprises lever means, attachable to the supporting base, for raising and lowering the movable shelf and the inner support block of the set of lockable holding means. Preferably, the cam-operated lever is a manually operated, two-position lever provided with a cam mechanism by which a handle may transfer movement to a fixed-travel push rod. The cam-operated lever is attached to the front edge of the supporting base by means of bolts, screws or any other suitable hardware. Preferably, steel screws sized to match the orifices provided on the front edge of the supporting base are used to secure the lever to the supporting base. The cam-operated lever is so located on the front edge of the supporting base as to allow its push rod to exert pressure on the recessed groove of the movable shelf and cause the shelf to hinge upwards and away from the supporting base when the handle of the cam-operated lever is moved to the up position.

The sliding position detection means comprise a plurality of position detectors mounted on sliding holders, strategically located and capable of moving over and retrieving from the surface of the crankshaft to be trued. The position detectors provide an out-of-tolerance indication of the positions of the crankshaft sections with respect to the rotational axis of the crankshaft. The position detectors may be conventional detectors of the type that include a feeler rod whose lower end bears on the crankshaft being trued and whose upper end is connected to a dial that displays the degree of distortion of the crankshaft.

The top-mounted clamp comprises hinged mechanical means for compressing and firmly holding the crankshaft to be trued. The top-mounted clamp is preferably mounted on the end of the movable shelf opposite the end on which the push rod of the cam-operated lever exerts pressure, so that the clamp moves with and whenever the shelf is made to hinge with respect to the surface of the supporting base. The top-mounted clamp is also preferably provided with its own independent mechanism for manually causing the clamp to hinge with respect to its mount on the movable shelf and be locked in an inactive or "up" position and a clamping or "down" position. Preferably, the clamp is provided with a set of adjustable rubber stoppers or similar adjustable means for improving the grip of the clamp on the surfaces with which it is made to come into contact. Such preferred means for improving the grip of the clamp are positioned on the clamp and sized so as to allow them to come into contact with the bearings of the crankshaft being trued and exert sufficient pressure on them to maintain the bearings firmly in position and keep the crankshaft from falling off or slipping.

In truing a crankshaft, an inner support block is chosen in accordance with the width and diameter of the bearings of the crankshaft which is to be trued. Thus, an inner support block is selected whose distance between its two parallel walls is long enough to accommodate the width of the bearings and short enough to provide a snug fit between the width of the bearings and the space created between the two walls, and whose depth and V opening are long enough and wide enough, respectively, to clear the diameter of the bearings. The width of the walls of the inner supporting block is not critical: the walls simply should be wide enough to provide structural integrity to this component of the invention. The two outer supporting blocks are chosen in accordance with the dimensions of the journals of the crankshaft which is to be trued. Thus, outer support blocks are selected whose depths and V openings are long enough and wide enough, respectively, to clear the diameter, or other applicable space defining dimension, of the journal webs. In addition, the walls of the outer supporting blocks should be wide enough to accommodate the webs, but not so wide as to interfere with the normal rotation of the connecting rod of the crankshaft. The movable shelf and the three support blocks are then placed on the supporting base so that the inner support block rests on the movable shelf and the two outer support blocks flank the movable shelf and the inner support block. The bottom of the inner support block is then attached to the top of the movable shelf by means of bolts or other suitable hardware, and the two outer support blocks and the movable shelf are attached to the base, also by means of bolts or other suitable hardware. The handle of the cam-operated lever is actuated to cause the lever push rod to move to the up position thereby pushing the movable shelf and the inner support block away from the surface of the supporting base and into the truing tool measuring position. The position detection means are slid forward towards the front edge of the supporting base and into the measuring position, and the independent mechanism of the top-mounted clamp is activated to cause the clamp to come down over the inner support block and hold the crankshaft in place for measuring. By bringing the position detection means in contact with the crankshaft at various strategic places on the crankshaft, the operator is able to determine the location and degree of distortion, or out-of-tolerance, of the workpiece, and decide how to carry out the necessary straightening correction. The operator then proceeds to change to the truing, or working, position. This is accomplished by first moving the handle of the cam-operated lever to cause the lever push rod to move to the down position, thereby pulling, or releasing, the movable shelf and the inner support block back to the surface of the supporting base, and then sliding the position detection means towards the back of the supporting base, while lifting and releasing the top-mounted clamp. The operator may then pinch, wedge, hit and/or take any other action required or desirable to straighten the crankshaft. The measuring and straightening cycle may be repeated once, or several times, until the desired truing of the crankshaft has been achieved.

BRIEF DESCRIPTION OF THE DRAWINGS

The invention will now be described in connection with a preferred embodiment and with reference to the accompanying drawings, wherein.

DETAILED DESCRIPTION OF THE INVENTION

Figure 1:
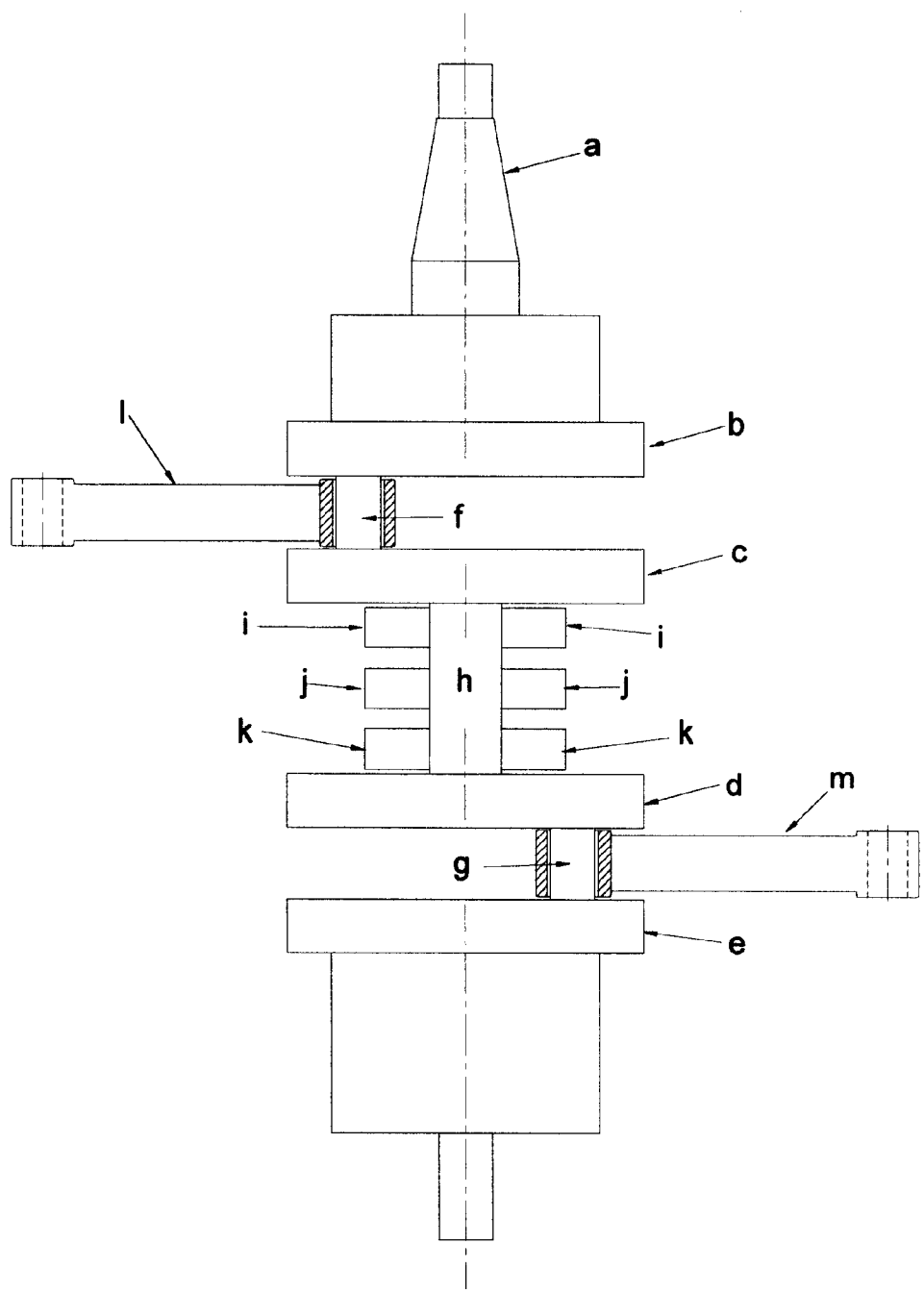
FIG. 1 is a vertical elevation of a crankshaft such as those which are trued by the truing tool and method of this invention.

By way of an illustration, a crankshaft, typical of the type of crankshafts that may be trued by the truing tool and method of this invention, is depicted in FIG. 1, where pressed-together crankshaft a includes webs b, c, d and e. Each web is an annular metal disc provided with an opening for receiving a metal pin. Webs may be round, square, tulip-shaped, elliptical or of any other suitable shapes. Webs b, c, d and e are round. Web b is connected to web c by peripheral pin f, which is press fit into web c and may be either press fit or forged into web b. Web c is connected to web d by means of connecting center pin h, which is press fit into web c and may be either press fit or forged into web d. Concentrically mounted ball bearings i, j and k surround connecting center pin h. Web d is connected to web e by means of peripheral pin g, which is press fit into web d and may be either press fit or forged into web e. A crankshaft of this type comprises two journals, attached to each other by a connecting center pin, and one or more associated bearings. In FIG. 1, that crankshaft includes peripheral pin f, web c, connecting center pin h, associated bearings i, j and k, web d and peripheral pin g. Connecting rods I and m, attached to peripheral pins f and g, respectively, connect the crankshaft to the corresponding pistons of the engine of which the crankshaft is part. A pressed-together multiple-cylinder-engine crankshaft may consist of one such set of webs, pins and bearings as described above, or it may consist of two or more of these sets connected in series. In fabricating these and similar crankshafts, a hydraulic ram is used to press fit two journals with a connecting center pin; the journals are then aligned, and the aligned journals press fit to other identical or similar journals. The end result is the fabricated pressed-together crankshaft. In this process, it is important that the webs remain parallel in relation to each other and that the angular orientation of the peripheral pins of the webs be set precisely at the desired angle, i.e., 180° for two-cylinder-engine crankshafts, 120° for three-cylinder-engine crankshafts, 90° for four-cylinder-engine crankshafts, etc. Peripheral pins f and g, in FIG. 1, are shown in a 180° angular orientation with respect to each other, as pressed-together crankshaft a is ideally suited for a two-cylinder-engine of the type often used by manufacturers of personal watercrafts and snowmobiles, as well as for other multi-cylinder outboard engines.

Figure 2:
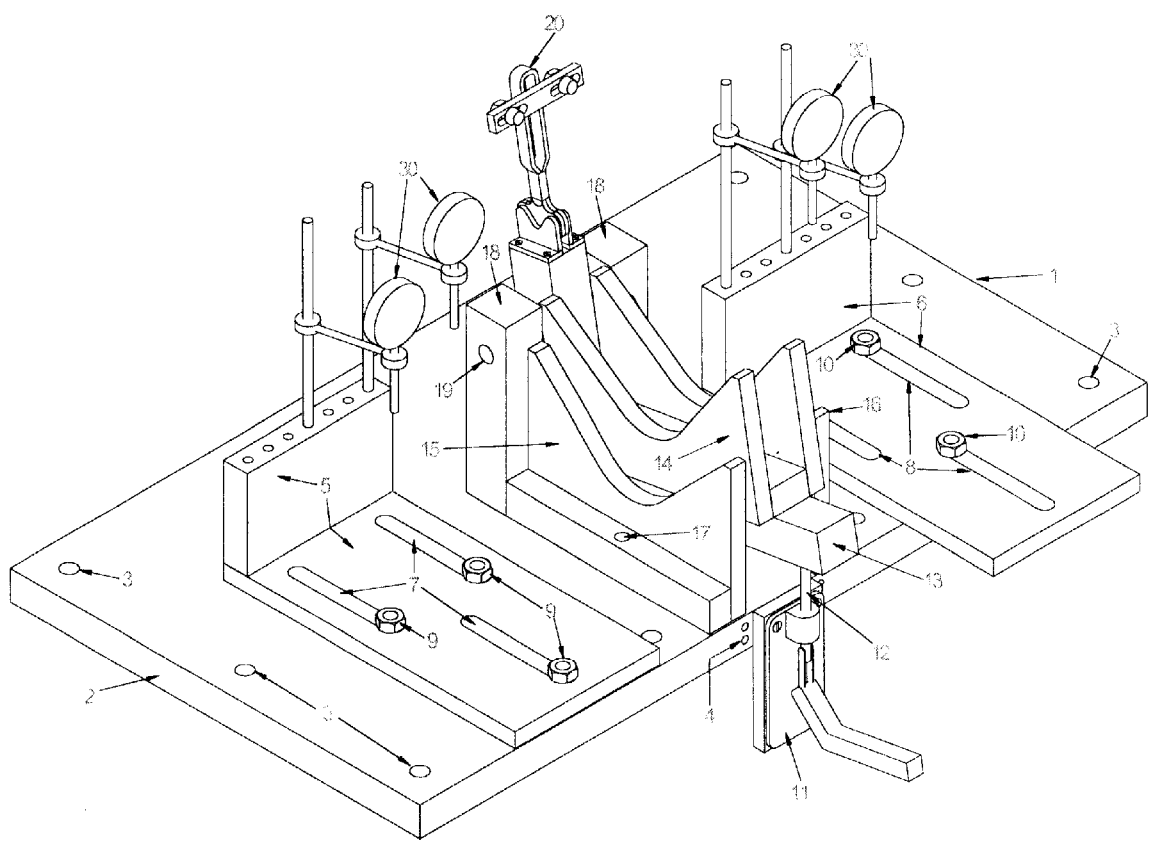
FIG. 2 is a general isometric schematic view of an apparatus (truing tool) according to the invention, including the supporting base, the set of lockable holding means, the movable shelf, the cam-operated lever, the sliding position detection means and the top-mounted clamp.

The crankshaft described above in conjunction with FIG. 1 may be straightened by truing tool 1 of FIG. 2, where the main components of the invention are shown in a general isometric schematic view. Referring to FIG. 2, then, supporting base 2 is a rigid metal plate provided with multiple openings 3 located and sized to receive screws, bolts or similar hardware suitable for securing supporting base 2 to a worktable or bench, and with multiple openings 4 located and sized to receive screws, bolts or similar hardware suitable for securing the cam-operated lever of the truing tool to the supporting base. Supporting base 2 is also provided with parallel rigid members 18, transversally located with respect to the surface of supporting base 2 and provided with symmetrical openings 19 for coupling with the hinging mechanism of movable shelf 13. The sliding position detection means 5 and 6 comprise L-shape metal rigid members on which conventional position detection means, such as feeler-rod-and-dial indicators 30, have been mounted. Sliding position detection means 5 and 6 are provided with multiple slots 7 and 8, respectively, which allow the position detection means to slide back and forth with respect to supporting base 2. The position detection means are also provided with multiple screws 9 and 10, respectively, which allow the detection means to be secured to supporting base 2. Multiple screws 9 and 10 are fastened into corresponding multiple openings on the surface of supporting base 2. Cam-operated lever 11 is attached to supporting base 2 by means screws which are sized to fit openings 4 on the base. The lever raises and lowers movable shelf 13 by means of push rod 12. Inner support block 14 rests on movable shelf 13 and is fastened to it by a screw (not shown) that penetrates the bottom of inner support block 14 and screws into the top of movable shelf 13. Outer support blocks 15 and 16 flank movable shelf 13 and inner support block 14, and are attached to supporting base 2 by means of screws 17. Top-mounted clamp 20 is mounted on the end of movable shelf 13 opposite the end on which push rod 12 exerts pressure on the shelf, and is provided with its own mechanism for hinging with respect to its mount on movable shelf 13, as will be described hereinbelow.

Figure 3:
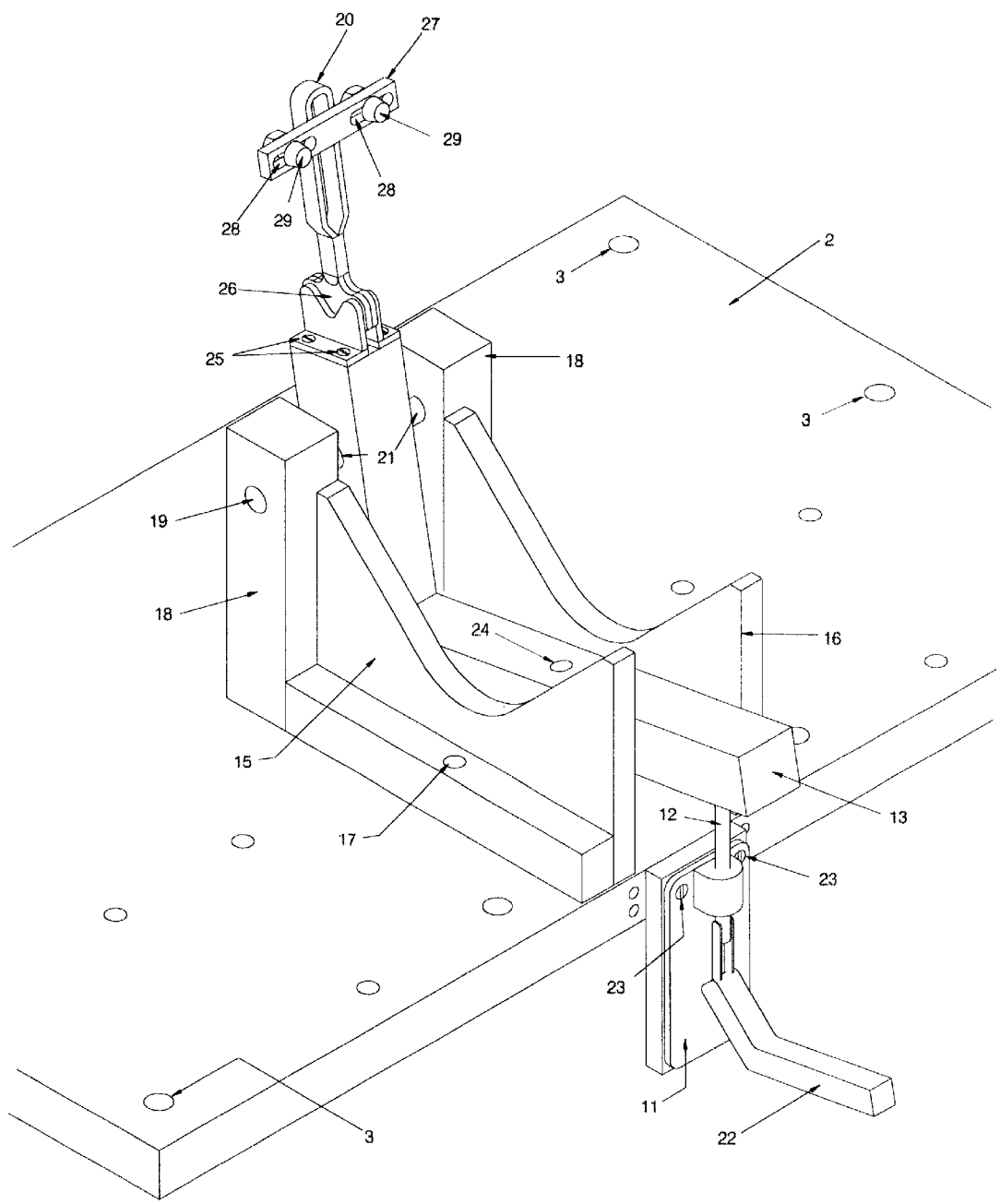
FIG. 3 is a partial isometric schematic view of the movable shelf of the invention, attached to the supporting base and flanked by the two outer support blocks, and shows the locations of the orifices for mounting the movable shelf and one of the two outer support blocks.

Movable shelf 13 is shown in FIG. 3 resting on supporting base 2 and attached to it by means of through rod 21, which passes through openings 19 in parallel rigid members 18 of supporting base 2. Preferably, through rod 21 comprises a shaft equipped with bearings, or bushings, on either side of movable shelf 13. This mechanism allows movable shelf 13 to hinge up and down with respect to the surface of supporting base 2 whenever handle 22 of cam-operated lever 11 is actuated to cause push rod 12 to move up or down and push or pull the tip of movable shelf 13. The bottom of movable shelf 13 is provided with a recessed groove (not shown) to engage and hold in place push rod 12 of cam-operated lever 11. Movable shelf 13 is also provided with threaded orifice 24 to allow inner support block 14 to be attached to movable shelf 13, as shown in FIG. 2, by means of a screw, bolt or other suitable hardware (not shown). Screws 23 are used to secure cam-operated lever 11 to supporting base 2. Preferably, cam-operated lever 11 is a two-position manually operated lever with a fixed-travel push rod. In a preferred embodiment, the length of the push rod is made adjustable, for example, by providing the push rod with a threaded tip on which extensions of different lengths may be screwed. In this fashion, an operator may easily accommodate different types of crankshafts which, due to their dimensions, may require movable shelf 13 to hinge up and down through different radial distances. When cam-operated lever 11 is in the down position, that is, when the lever has been actuated to cause push rod 12 to remain down so that movable shelf 13 rests on and parallel to supporting base 2, the weight of the crankshaft will be on outer support blocks 15 and 16. This corresponds to the truing position of the truing tool. When cam-operated lever 11 is then moved to the up position, that is, when the lever is actuated so as to cause push rod 12 to move up and push movable shelf 13 radially upwards and away from the front edge of supporting base 2, the weight of the crankshaft transfers to the inner support block, and this corresponds to the measuring position of the truing tool. Top-mounted clamp 20 is preferably mounted on the end of movable shelf 13 opposite the end of the shelf on which push rod 12 exerts pressure, so that the clamp moves with and whenever movable shelf 13 is made to hinge with respect to the surface of supporting base 2. Screws 25 are used to secure clamp 20 to the end of movable shelf 13. Top-mounted clamp 20 is also provided with its own independent mechanism 26 for allowing clamp 20 to hinge with respect to its mount on movable shelf 13, towards to and away from the rotational axis of the crankshaft being trued, and be locked in an inactive or "up" position, used during truing, and a clamping or "down" position, used during measuring. Clamp 20 is shown in the up position in FIG. 3. In a preferred embodiment, top-mounted clamp 20 is equipped with transversally mounted bar 27, which is provided with notched grooves 28. Two adjustable rubber stoppers 29 are inserted into notched grooves 28 and fastened in place at different positions so that the distance between the two stoppers 29 on transversally mounted bar 27 becomes readily adjustable. In this fashion, an operator may true different crankshafts of different dimensions, for example, crankshafts with different size bearings, by simply manually changing the distance between the two rubber stoppers 29 on transversally mounted bar 27, as well as the distance that rubber stoppers 29 project out from transversally mounted bar 27, to make the stoppers grip the bearings or other components of the crankshaft at the desired points of contact. Top-mounted clamp 20 is most useful when truing pressed-together crankshafts of the type used in three-or-more-cylinder engines, since these crankshafts have uneven weight distribution and tend to become unbalanced on the truing tool when not clamped.

Figure 4:
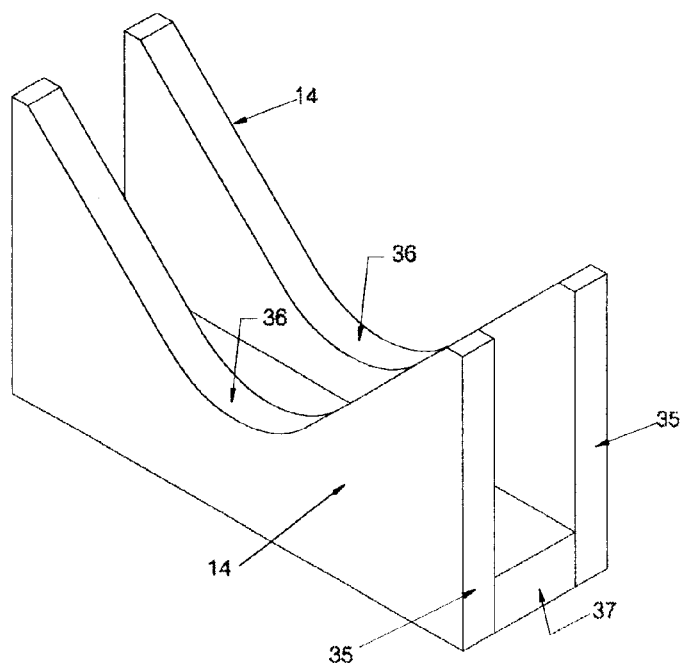
FIG. 4 includes a general isometric schematic view of the inner support block and a general isometric schematic view of the outer support blocks.
Figure 4:
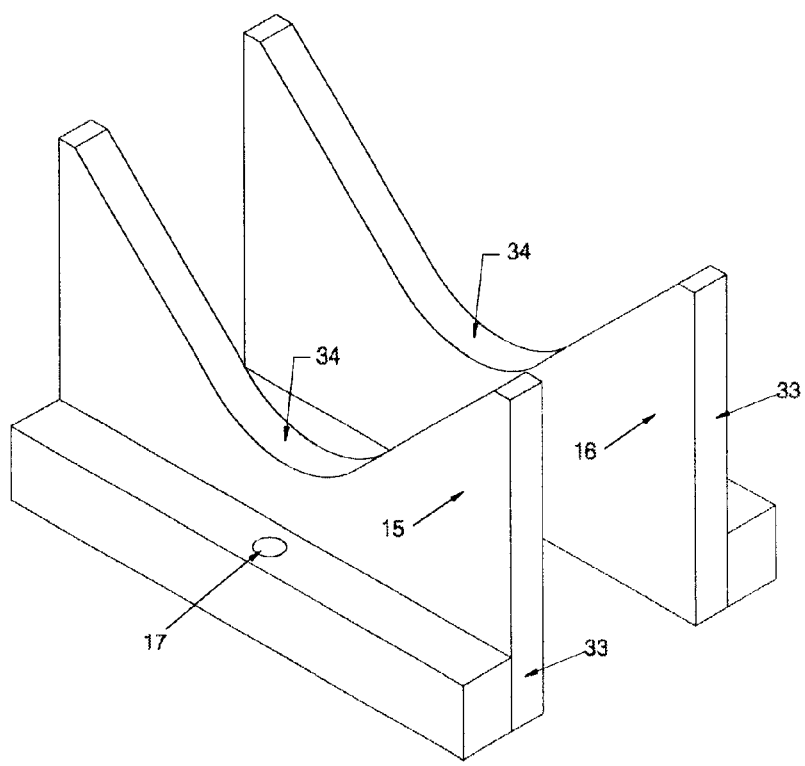

FIG. 4 shows the set of lockable holding means of the truing tool, that is, the inner support block and its two companion outer support blocks. Each such blocks is provided with one or more openings adapted to receive one or more bolts or other means for securing the blocks, and shaped as to allow the blocks to receive and hold the crankshaft to be trued. Thus, inner support block 14 is provided with one or more openings at the bottom to allow it to be locked to movable shelf 13 and hinge up and down with respect to the surface of supporting base 2 when the shelf is driven by cam-operated lever 11. Inner support block 14 is located and sized to receive and hold the bearings of the crankshaft when the truing tool is in the measuring position. In a preferred embodiment, inner support block 14 consists of two identical V-shape parallel walls 35 joined at their bottoms by base 37. The width of the parallel walls of inner supporting block 14 is not critical: the walls simply should be wide enough to provide structural integrity to this component of the invention. The angular dimensions of curvatures 36 of walls 35 may vary, depending on the shape and size of the bearings that will rest on walls 35 when the truing tool is set on the measuring position. Curvatures of approximately 90 degrees are acceptable for most applications. Outer support blocks 15 and 16 flank inner support block 14 and movable shelf 13 on supporting base 2 (as shown if FIG. 2), and may be attached to the supporting base of the truing tool by means of screws 17. The two support blocks are laterally spaced out on supporting base 2 so as to enable them to receive the journals of the crankshaft that is being trued. Outer support blocks 15 and 16 are chosen and sized to receive and hold the crankshaft journals when the truing tool is in the truing position. The angular dimensions of curvatures 34 of parallel walls 33 of support blocks 15 and 16 may vary, depending on the shape and size of the journals that will rest on walls 33 when the truing tool is set on the truing position. The angle of curvatures 34 should be large enough to clear the diameter of the journal webs and small enough to provide a snug fit. Curvatures of approximately 90 degrees are acceptable for most applications. Parallel walls 33 should be wide enough to accommodate the, webs, but not so wide as to interfere with the normal rotation of the connecting rod of the crankshaft. The three support blocks are preferably made of steel and are preferably V shaped, but they may be made of any other rigid metal or material and shaped in any other configuration or form that will allow the blocks to receive and hold the crankshaft to be trued.

Figure 5:
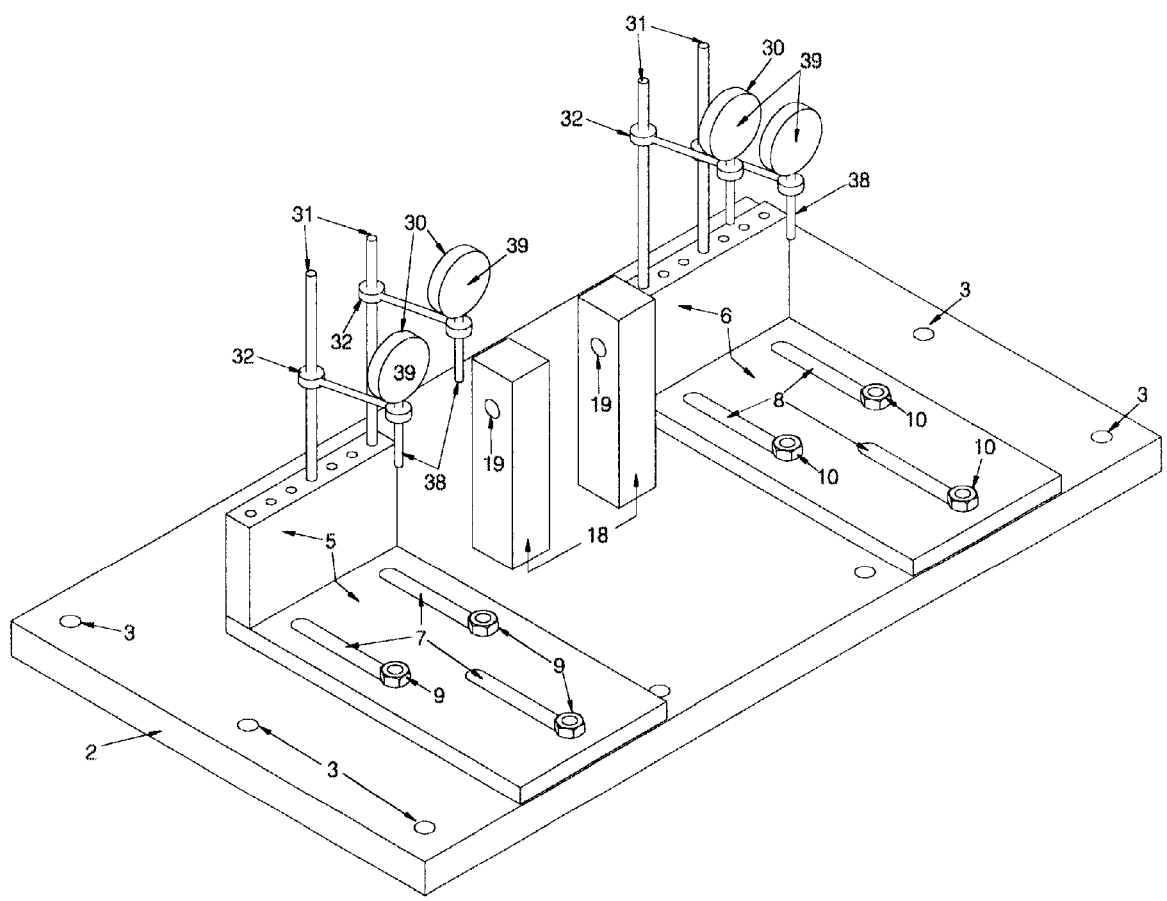
FIG. 5 is a general isometric schematic view of the sliding position detection means, attached to the supporting base of the invention.

The sliding position detection means of the truing tool are depicted in FIG. 5. The sliding position detection means comprise a plurality of position detectors 30 mounted on sliding holders 5 and 6 by means of adjustable poles 31. Position detectors 30 are strategically located and capable of moving over and retrieving from the surface of the crankshaft to be trued. The detectors provide an out-of-tolerance indication of the position of the crankshaft with respect to the rotational axis of the crankshaft. In a preferred embodiment, the position detectors comprise feeler rods 38 whose lower ends may be made to bear on the crankshaft being trued and whose upper ends are connected to dials 39 that display the degree of distortion of the crankshaft. Position detectors 30 are preferably equipped with rotating hinging mechanisms 32 that allow the feeler rods to project away from adjustable poles 31 in multiple linear and angular directions so that their lower ends may be made to bear on the crankshaft being trued at the exact locations desired by the operator.

Figure 6:
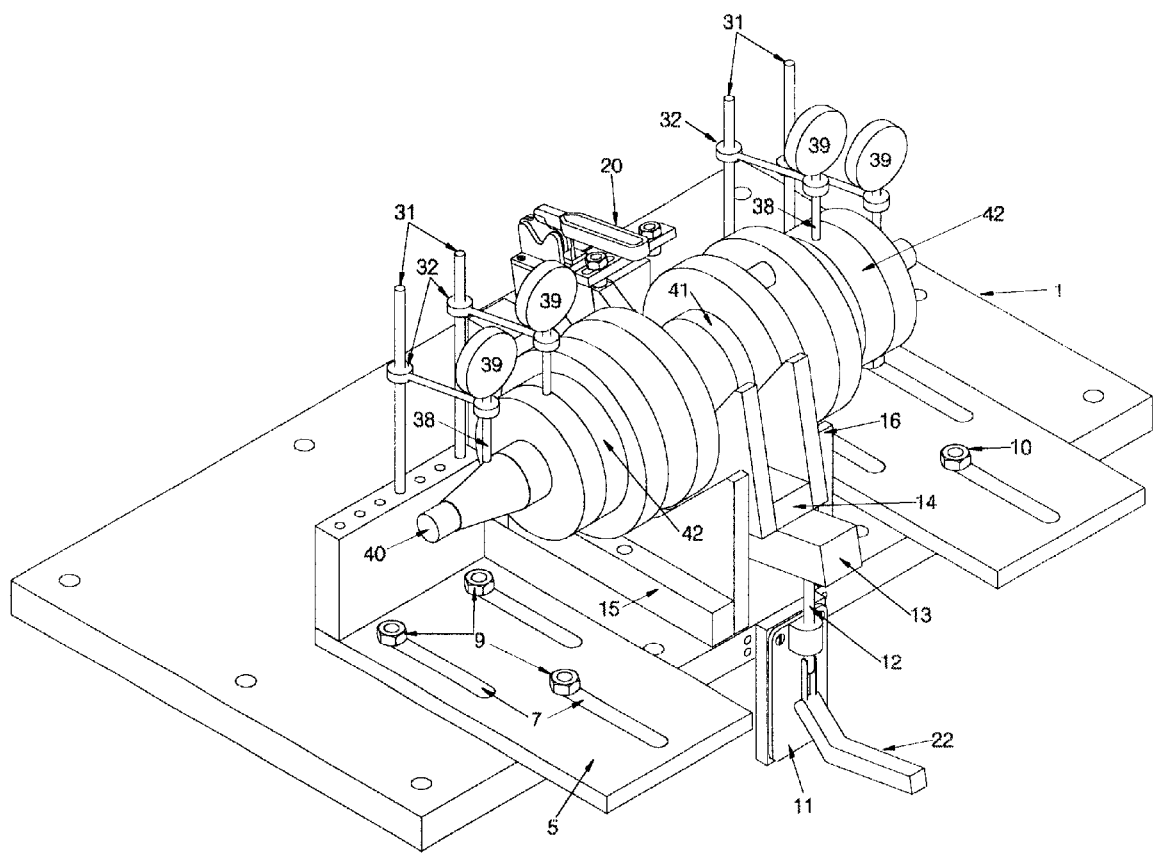
FIG. 6 is a general isometric schematic view of the truing tool of the invention showing its components in the measuring position, and showing also the placement of a crankshaft on the truing tool as it is ready for measuring.
Figure 7:
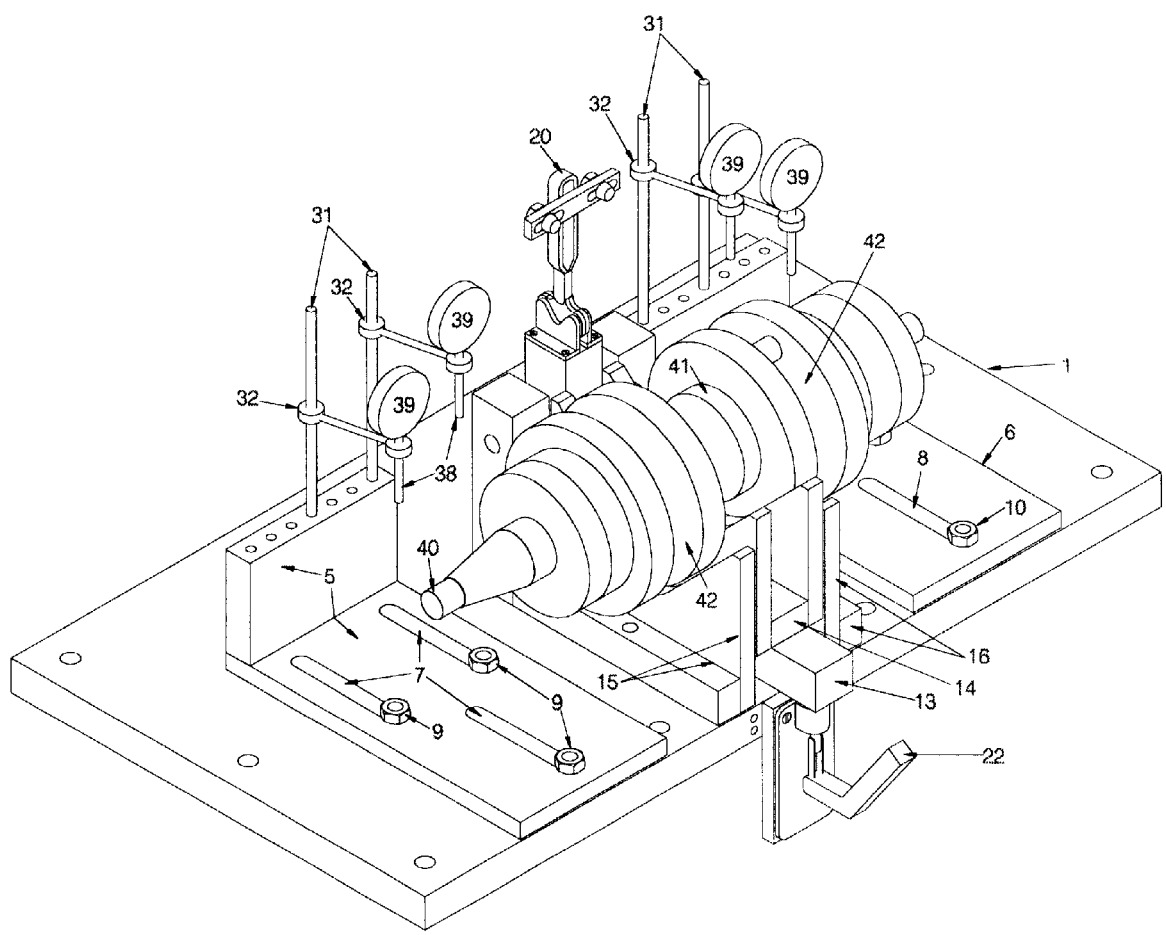
FIG. 7 is a general isometric schematic view of the truing tool of the invention showing its components in the truing position, and showing also the placement of a crankshaft on the truing tool as it is prepared for truing.

An example will now be given of how to true a crankshaft in accordance with the method of this invention and utilizing the truing tool described herein. A typical crankshaft of the type trued by the method of this invention is crankshaft 40, depicted in FIGS. 6 and 7. Crankshaft 40 is a pressed-together crankshaft suitable for use in multi-cylinder engines and similar to the crankshaft shown in FIG. 1 and identified therein as crankshaft a. Referring to FIG. 6, crankshaft 40 is first placed on truing tool 1, and truing tool I set on the measuring position. This is accomplished by actuating handle 22 of cam-operated lever 11 to cause push rod 12 to raise movable shelf 13 so that inner support block 14 moves up and receives bearings 41 of crankshaft 40. Position detector sliding holders 5 and 6 are moved forward on multiple slots 7 and 8 and fastened at the desired positions by multiple screws 9 and 10. The position detectors are then brought to bear on journals 42 and on any other components of the crankshaft which the operator may wish to measure for deviations with respect to the rotating axis of crankshaft 40. Swiveling mechanisms 32 are used to place the tips of feeler rods 38 at the exact crankshaft locations desired by the operator. Top-mounted clamp 20 is manually actuated to hinge down on top of inner support block 14 so as to grip bearings 41 and hold them in place. The operator then rotates crankshaft 40 around its axis, e.g., by manually pushing and pulling the connecting rod in a piston-like motion, and determines the existence and degree of distortion at the measured crankshaft locations by reading the deviations indicated on position detector dials 39. Next, with the crankshaft still on the truing tool, the tool is set on the truing position by first manually raising top-mounted clamp 20 to its inactive position, moving position detector sliding holders 5 and 6 back and out of the way by sliding them on slots 7 and 8, respectively, and fastening them to the supporting base with screws 9 and 10, respectively, and actuating handle 22 of cam-operated lever 11 to lower its push rod and bring movable shelf 13 and inner support block 14 back to their resting positions on the supporting base. FIG. 7 shows crankshaft 40 on truing tool 1 in the truing position. At this point, the two stationary outer support blocks 15 and 16 are in contact with and receive journals 42 of crankshaft 40. With journals 42 resting on top of outer support blocks 15 and 16, inner support block 14 is not in contact with any part of crankshaft 40 and the weight of the crankshaft is supported by outer support blocks 15 and 16. The operator then proceeds to pinch, hammer, wedge and/or otherwise apply the forces necessary to effect the straightening of the workpiece until the distortion of the crankshaft is minimized or eliminated. In a typical operation, anywhere from one to five strokes of medium exertion with a # 5 hammer may very well achieve the desired straightening. The operator may then measure the results obtained after performing one "measuring" and one "truing" by setting the truing tool in the measuring position again, with the crankshaft still placed on the tool, and determining the resulting degree of truing by repeating the steps set forth above. If additional straightening is deemed necessary or desirable, the operator may reset the truing tool on the truing position and proceed to make the necessary further corrections. This cycle of measuring-and-truing may be repeated as necessary or desired until the operator achieves zero distortion from the rotational axis of the crankshaft, or some other acceptable degree of truing, all without having to remove the crankshaft from the truing tool.

In the foregoing disclosure, the truing apparatus of the present invention and most of its components have been described as made of steel. While the preferred material of construction is steel, and, in particular, steel that may be hardened to a Rockwell B Scale hardness of 68 or higher, it should be understood that the truing tool and its components may be fabricated of any other metal or material so long as said metal or material is strong and hard enough to support the stresses and compression forces inherent in truing and fabricating most commercial crankshafts.

Although the foregoing description and drawings describe and illustrate in detail the preferred and other embodiments of the present invention, said description and drawings will suggest other modifications and different embodiments without thereby departing from the spirit and scope of the present invention, which is intended to be limited only by the scope of the claims that follow. For example, although in the preferred embodiment the top-mounted clamp is attached to the movable shelf and equipped with a set of stoppers on a transversally mounted bar, other clamping means, similarly effective for gripping and holding the crankshaft components in place during "measuring" may be used. Such means need not be attached to the movable shelf, but may be mounted, for example, on the parallel rigid members which hold the through rod on which the movable shelf hinges, or they may be mounted directly on the supporting base or some other component of the truing tool. Also, many other configurations and designs may suggest themselves, within the scope of the claimed invention, for instantly moving the crankshaft from a measuring position to a truing position, and back to a measuring position, through the application of the multiple-position shelf assembly concept described herein. Likewise, although in the preferred embodiment slots and screws are used to move and hold in place the position detection means, any other kind of hardware or mechanism for allowing the operator to move the position detection means in and out of the way, as specifically called for by the present specifications, may be used within the scope of the claimed invention.

I claim:

1. An apparatus for truing a crankshaft, said apparatus comprising:

(a) a supporting base;

(b) a set of lockable holding means, attachable to said supporting base, comprising at least one movable support block and two stationary support blocks, flanking said movable support block and laterally adjustable with respect to each other, each such support block shaped as to allow the blocks to receive and hold said crankshaft;

(c) a movable shelf, attachable to said movable support block, provided with means for causing it to hinge with respect to the surface of said supporting base;

(d) lever means, attachable to said supporting base, for raising and lowering said movable shelf;

(e) a plurality of position detection means mounted on holders, attachable to said supporting base and capable of sliding across said supporting base and moving and retrieving said position detection means over said crankshaft; and (f) clamping means, attachable to said apparatus, for compressing and holding in place said crankshaft to be trued.

2. The apparatus of claim 1, wherein said supporting base comprises a rigid steel plate, provided with multiple openings strategically located to receive parts of the other components of said apparatus and to secure said rigid steel plate to a workbench.

3. The apparatus of claim 2, wherein said supporting base further comprises at least two rigid members, parallel to each other and transversally located with respect to the surface of said supporting base, provided with means for accepting and coupling with said means for causing said movable shelf to hinge with respect to the surface of said supporting base.

4. The apparatus of claim 1, wherein each of said support blocks is provided with one or more openings adapted to receive means for securing said blocks to said supporting base.

5. The apparatus of claim 1, wherein said movable support block is provided with one or more openings at its bottom to allow it to be locked to said movable shelf.

6. The apparatus of claim 5, wherein said movable support block and said stationary support blocks are V shaped and made of steel.

7. The apparatus of claim 5, wherein said movable support block is so located on said supporting base and sized to receive and hold in place the bearings of said crankshaft when said apparatus is in the measuring position.

8. The apparatus of claim 1, wherein said movable shelf is an L-shaped rigid member.

9. The apparatus of claim 8, wherein said movable shelf is provided with at least one orifice capable of accepting means for locking said movable shelf to said movable support block.

10. The apparatus of claim 9, wherein the bottom of said movable shelf is provided with recessed groove means for receiving and holding in place said lever means for raising and lowering said movable shelf.

11. The apparatus of claim 1, wherein said lever means comprise a manually-operated push rod lever provided with a handle and a cam mechanism by which said handle may transfer movement to said push rod.

12. The apparatus of claim 11, wherein said lever means are attached to the front edge of said supporting base.

13. The apparatus of claim 1, wherein said position detection means comprise feeler position detection rods capable of bearing on said crankshaft when said apparatus is in the measuring position and connected to a plurality of dials capable of displaying the degree of distortion of said crankshaft with respect to its axis of rotation.

14. The apparatus of claim 1, wherein said clamping means for compressing and holding in place said crankshaft comprise hinged mechanical means mounted on the end of said movable shelf opposite the end on which said lever means exert pressure.

15. The apparatus of claim 14, wherein said clamping means are provided with a set of rubber stoppers so sized and positioned on said clamping means as to allow them to come into contact with the bearings of said crankshaft when said apparatus is in the measuring position and exert sufficient pressure on said crankshaft bearings to maintain them firmly in position and keep the crankshaft from falling off said apparatus.

16. A method of truing a crankshaft having at least one set of bearings and at least two journals connected by a center pin, said method comprising:

(a) providing a set of lockable holding means, attached to a supporting base, said set of lockable holding means comprised of at least one movable support block and two stationary support blocks flanking said movable support block and laterally adjustable with respect to each other;

(b) attaching to said supporting base a movable shelf attached to said movable support block and provided with means for causing said movable shelf to hinge with respect to the surface of said supporting base;

(c) attaching to said supporting base a plurality of position detection means mounted on holders capable of sliding across said supporting base and moving and retrieving said position detection means over said crankshaft when said crankshaft is placed on said apparatus;

(d) causing said movable shelf to hinge with respect to said supporting base so as to raise said movable support block into a measuring position;

(e) placing said crankshaft on said set of lockable holding means by resting said bearings on said movable support block;

(f) bringing said position detection means to bear on a plurality of points on the surface of said crankshaft so as to detect the location and degree of distortion of the crankshaft with respect to its axis of rotation; and (g) applying forces on said detected locations in amounts sufficient to correct said detected degrees of distortion of the crankshaft with respect to its axis of rotation to straighten said crankshaft.

17. The method of claim 16, wherein said movable support block is so located on said supporting base and sized to receive and hold in place the bearings of said crankshaft when said apparatus is in the measuring position.

18. The method of claim 17, wherein said stationary support blocks are so located on said supporting base and sized to receive and hold in place the journals of said crankshaft when said apparatus is in the truing position.

19. The method of claim 18, wherein said movable shelf is caused to hinge at one end, with respect to said supporting base, by exerting pressure with a manually-operated push rod lever on the end of said movable shelf opposite the end at which it is caused to hinge.

20. The method of claim 19, further comprising compressing and holding in place said crankshaft by means of hinged mechanical means mounted on the end of said movable shelf opposite the end on which said manually-operated push rod lever exerts pressure.

* * * * *